US006459796B1

(12) United States Patent
Whitecar et al.

(10) Patent No.: US 6,459,796 B1
(45) Date of Patent: Oct. 1, 2002

(54) AM STEREO RECEIVER WITH REDUCED DISTORTION

(75) Inventors: John Elliott Whitecar, Plymouth; Frank Michael Hirschenberger, Farmington Hills; J. William Whikehart, Novi, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/104,603

(22) Filed: Jun. 24, 1998

(51) Int. Cl.[7] .......................... H04H 5/00; H04L 27/22; H04L 27/20; H04L 5/12; H04L 27/36

(52) U.S. Cl. ................................ 381/15; 2/4; 375/261; 375/298; 329/304; 332/103

(58) Field of Search ................... 381/15, 2, 4; 375/261, 375/298; 329/304; 332/103

(56) References Cited

U.S. PATENT DOCUMENTS 4,172,966 A 10/1979 Parker et al.
4,192,968 A 3/1980 Hilbert et al.
4,218,586 A 8/1980 Parker et al.
5,014,316 A 5/1991 Marrah et al.
5,222,144 A 6/1993 Whikehart
5,357,574 A * 10/1994 Whitecar ..................... 381/15

* cited by examiner

*Primary Examiner*—Forester W. Isen
*Assistant Examiner*—Laura A. Grier
(74) *Attorney, Agent, or Firm*—MacMillan, Sobanski & Todd, LLC; Mark L. Mollon

(57) ABSTRACT

Left and right stereo audio information is reproduced from a compatible quadrature amplitude modulation (C-QUAM) broadcast using two separate modes of detection. In the first mode, a true C-QUAM detection is performed when the signal being received has a high level of stereo difference information. In the second mode, a synchronous detection approximation is used which avoids generating an envelope signal or calculating a cosine correction factor as in true C-QUAM decoding. The second mode is used when over-modulation is present in the received signal.

11 Claims, 2 Drawing Sheets

AM STEREO RECEIVER WITH REDUCED DISTORTION

BACKGROUND OF THE INVENTION

The present invention relates in general to a radio receiver for receiving compatible quadrature amplitude modulation (C-QUAM) stereo radio signals, and more specifically, to detecting AM stereo signals using either of two separate stereo detection modes to minimize distortion in reproduced audio.

In commercial AM or medium-wave broadcasting, stereo stations broadcast using compatible quadrature amplitude modulation (C-QUAM) signals so that non-stereo capable receivers can still receive a compatible monophonic signal. As is known in the art, C-QUAM modulation involves phase modulating the stereo sum (L+R) and stereo difference (L−R) channels in quadrature followed by multiplying the phase components by a cosine correction factor. The signal is then limited to remove any amplitude variations and is finally amplitude modulated by the monophonic (L+R) signal. At the receiver end, a non-stereo capable receiver receives a compatible signal by recovering just the final amplitude modulation. In a stereo receiver, phase information is recovered in order to detect the stereo channels. In a typical receiver, the in-phase (I) signal component and the quadrature-phase (Q) signal component are synchronously detected. An envelope detector detects the envelope of the received AM signal. The I signal and the envelope signal are compared in order to recreate the cosine correction factor. The I and Q signals are multiplied by the correction factor to reverse the modulation process previously performed at the transmitter end. The cosine-corrected I and Q signals (or the envelope signal and the Q signal) are input to a stereo decoder for decoding left and right stereo channels.

An audio output of a typical C-QUAM receiver can be extremely distorted during adverse signal reception conditions such as when over-modulation or co-channel interference exists. When these errors are introduced into the received signal, the ideal C-QUAM calculations suffer from exacerbated distortion due to phase errors.

Co-pending U.S. application Ser. No. (197-0829 ), which is incorporated herein by reference, discloses a simplified C-QUAM stereo detector which provides reduced distortion relative to normal C-QUAM detection under adverse signal reception conditions. However, this simplified detector introduces approximation errors that, although they are small for most types of broadcast material, can become noticeable for certain types of broadcast material. Thus, neither type of detector can be expected to provide the best, least distorted audio reproduction for 100% of the time.

SUMMARY OF THE INVENTION

The present invention has the advantage of selecting between stereo detection modes in order to obtain optimized audio reproduction during both good reception conditions and adverse reception conditions without having to revert to monophonic reception.

In one aspect, the present invention provides a method for reproducing left and right stereo audio signals in response to an AM stereo broadcast signal wherein a stereo sum signal and a stereo difference signal are modulated using compatible quadrature amplitude modulation (C-QUAM) including a correction factor. The broadcast signal is converted to an intermediate frequency (IF) signal. Coherent sine and cosine injection signals are generated in response to the IF signal. The sine and cosine injection signals are mixed with the IF signal to produce an in-phase demodulated (I) signal and a quadrature-phase demodulated (Q) signal, respectively. In response to at least one of the I or Q signals, either a C-QUAM mode or a pseudo-C-QUAM mode is selected for decoding the stereo sum and stereo difference signals. The C-QUAM mode includes modifying at least the Q signal according to a cosine correction factor prior to decoding the stereo sum and stereo difference signals. The pseudo-C-QUAM mode does not modify the I or Q signals according to the cosine correction factor prior to decoding the stereo sum and stereo difference signals.

DETAILED DESCRIPTION OF PREFERRED EMBODIMENTS

Figure 1:
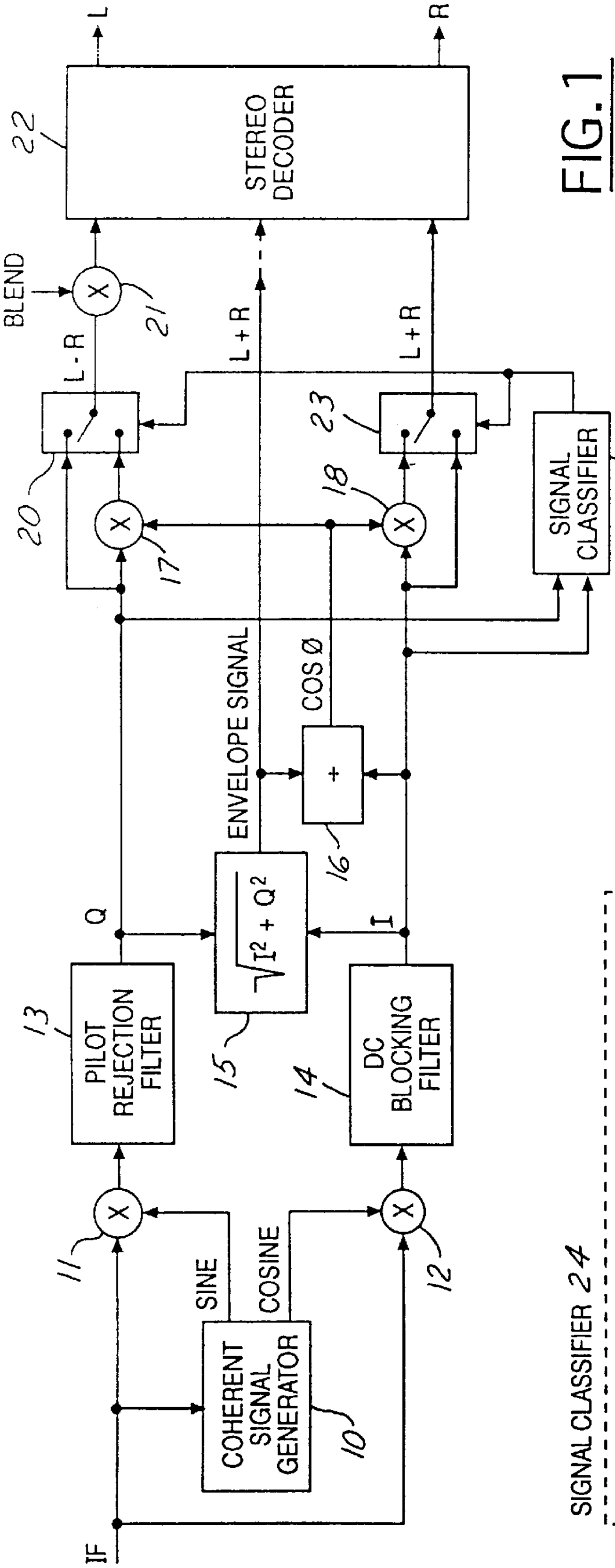
FIG. 1 is a block diagram showing a C-QUAM AM stereo receiver according to the present invention.

Referring to FIG. 1, a preferred embodiment of a digital signal processing (DSP) radio receiver according to the present invention employs a coherent signal generator 10 receiving a C-QUAM IF signal from an A/D converter (not shown). Generator 10 may be comprised of a phase-locked loop or an adaptive line enhancer as taught in U.S. Pat. No. 5,357,574, which is incorporated herein by reference. Sine and cosine injection signals are provided from generator 10 to inputs of mixers 11 and 12, respectively. Mixers 11 and 12 also receive the C-QUAM IF signal. By mixing the cosine and sine injection signals with the IF signal, an in-phase demodulated (I) signal and a quadrature-phase demodulated (Q) signal are produced. The Q signal from mixer 11 includes a 25 Hz stereo pilot signal which is removed by a pilot rejection filter 13. The I signal from mixer 12 includes the DC component of the AM modulation which is removed in a DC blocking filter 14.

The synchronously detected I and Q signals are coupled to an envelope detector 15. The square root of the sum of the squares of I and Q is calculated in envelope detector 15 to produce an envelope signal. The envelope signal is divided by the I signal in a divider 16 which produces the cosine correction factor signal cos(ϕ).

The cosine correction factor cos ϕ is multiplied by the Q and I signals in multipliers 17 and 18, respectively. The corrected Q and I signals are coupled from multipliers 17 and 18, respectively, to inputs on a pair of signal multiplexers 20 and 23, respectively. Second inputs on multiplexers 20 and 23 are connected directly to the uncorrected Q and I signals, respectively. The output of multiplexer 20 provides the stereo difference signal L−R, which is passed through a blend multiplier 21 for controlling the amount of stereo blend, and to the difference input of a stereo decoder 22. The output of multiplexer 23 provides the stereo sum channel and is connected to the sum L+R input of stereo decoder 22. Multiplexers 20 and 23 either both select the corrected I and Q signals or the uncorrected I and Q signals under control of a signal classifier 24 which receives the I and Q signals at its inputs.

In an alternative embodiment, the envelope signal could be used to provide the stereo sum signal L+R instead of the I signal. In that embodiment, multiplier 18 and multiplexer 23 could be eliminated.

Signal classifier 24 examines the I and Q signals to determine whether the conditions within the broadcast signal currently include a high level of stereo difference information or over-modulation. These conditions then indicate whether either a true C-QUAM or an approximated pseudo-C-QUAM mode will then provide the best audio signal reproduction. When receiving a C-QUAM broadcast under adverse reception conditions such as over-modulation, phase information in the received signal is corrupted and normal C-QUAM decoding suffers large distortion. During such conditions, an approximation of C-QUAM detection referred to herein as pseudo-C-QUAM is used, wherein the I and Q signals are used as approximations of the stereo sum and difference channels, respectively, to produce an audio output of better perceived quality to the listener. On the other hand, use of the pseudo-C-QUAM approximation introduces an approximation error which can become quite large when a broadcast consists primarily of stereo difference information (i.e., L=−R modulation), especially at frequencies less than 300 Hz. Thus, the receiver of FIG. 1 can operate in either a C-QUAM mode or a pseudo-C-QUAM mode depending on reception characteristics identified in signal classifier 24. In the C-QUAM mode, multiplexers 20 and 23 pass the corrected I and Q signals to stereo decoder 22. In pseudo-C-QUAM mode, multiplexers 20 and 23 pass the uncorrected I and Q signals to stereo decoder 22. Signal classifier 24 preferably places the receiver in C-QUAM mode whenever a large amount of stereo difference information is present (i.e., the level of the L−R signal is high) and places the receiver in pseudo-C-QUAM mode whenever over-modulation is present.

Figure 2:
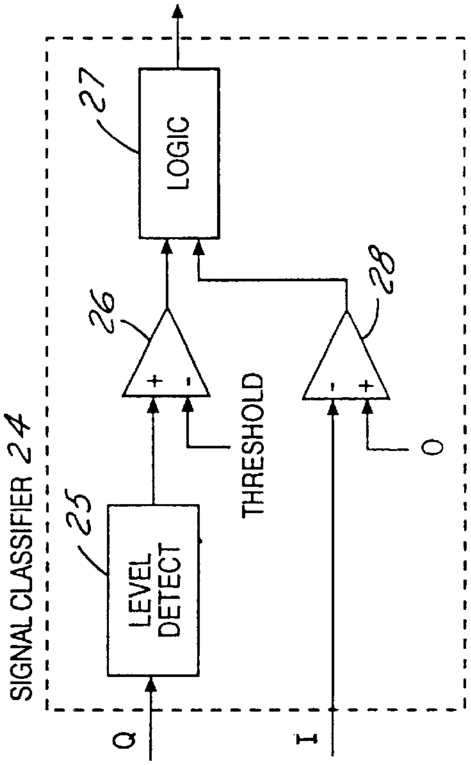
FIG. 2 is a block diagram showing the signal classifier of FIG. 1 in greater detail.

FIG. 2 shows one preferred embodiment of signal classifier 24. The Q signal is coupled to a detector 25 which level detects the Q signal and provides the level signal to the non-inverting input of a comparator 26. A threshold is provided to the inverting input of comparator 26 to identify a level at which the stereo difference information is sufficiently high to necessitate use of true C-QUAM decoding. In an alternative embodiment, it may be desirable to lowpass filter the Q signal prior to level detector 25 so that only stereo difference information at low frequencies will cause a switch to true C-QUAM mode. In either case, the output of comparator 26 is connected to a logic block 27 which generates an output signal for controlling the signal multiplexers.

Also within signal classifier 24, the I signal is coupled to the inverting input of a comparator 28. The non-inverting input of comparator 28 receives a value of about zero. When the value of I drops below zero, then over-modulation is present in the incoming IF signal. The output of comparator 28 is also coupled to logic block 27. As soon as the value of the I signal goes below zero, an over-modulation condition can be detected. However, the value of the I signal does not stay at zero during the entire time that over-modulation is present. Thus, the over-modulation condition is assumed to exist until the instantaneous value of the I signal has not been less than zero for at least a pre-determined time. Therefore, in one preferred embodiment of the present invention, logic block 27 monitors the output of comparator 28 over various time periods after a negative value of the I signal has been detected. In other embodiments, logic block 27 may simply be comprised of a latch which may be toggled by the outputs of comparators 26 and 27, for example.

Figure 3:
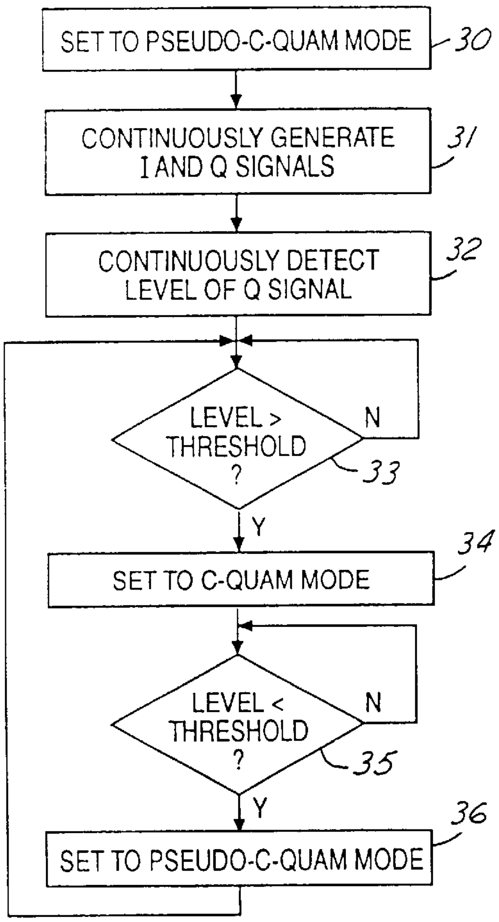
FIG. 3 is a flowchart showing a first embodiment for a method of operating the receiver of FIG. 1.

Several different control methods may be implemented using various modifications of signal classifier 24. In a first embodiment as shown in FIG. 3, the receiver may be preferentially placed in the pseudo-C-QUAM mode and is switched to the C-QUAM mode only when necessary as determined by the level of stereo difference information. Thus, only the portion of signal classifier 24 which monitors the Q signal is needed. As shown in FIG. 3, the receiver is put into pseudo-C-QUAM mode initially in step 30. Throughout the method, the receiver continuously generates the I and Q signals in step 31. In step 32, the receiver continuously detects the level of the Q signal in the manner shown in FIG. 2. In step 33, the continuously detected level of the Q signal is compared with the threshold. As long as the level is not greater than the threshold, the method continuously performs the comparison of step 33. When the level is greater than the threshold, then the receiver is set to the C-QUAM mode in step 34. Thereafter, the method compares the level of the Q signal with the threshold in step 35 until the level is less than the threshold (or a slightly reduced threshold in order to introduce hysteresis). At that point, the receiver is set back to the pseudo-C-QUAM mode in step 36 and a return is made to the comparison in step 33. Consequently, the receiver operates in the pseudo-C-QUAM mode except when the stereo difference level is at a high level which can be more accurately received by using the C-QUAM mode.

Figure 4:
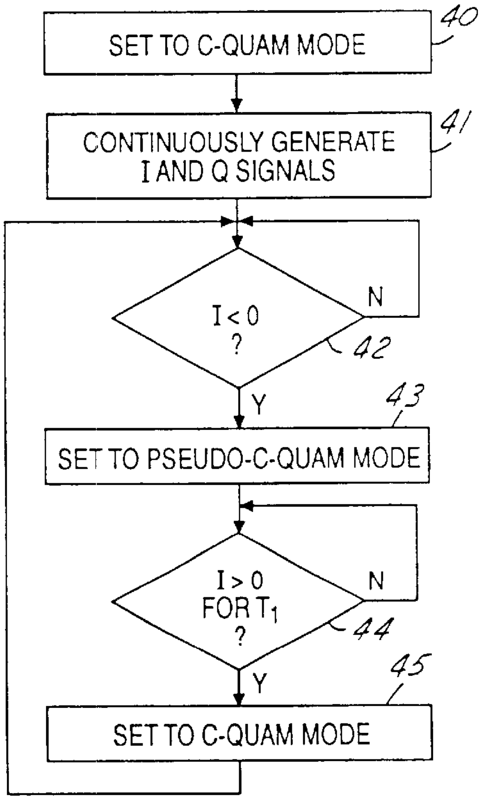
FIG. 4 is a flowchart showing a second embodiment for a method of operating the receiver of FIG. 1.

FIG. 4 shows an alternative embodiment wherein the receiver is preferentially set to the true C-QUAM mode. Thus, the receiver is initially set to the C-QUAM mode in step 40 and the I and Q signals are continuously generated in step 41. In step 42, the I signal is compared with zero to identify the presence of over-modulation. Step 42 repeats as long as the value of I has not fallen below zero. When the I signal drops below zero, then the receiver is set to the pseudo-C-QUAM mode in step 43. While in pseudo-C-QUAM mode, the instantaneous value of the I signal is compared to zero in step 44. A series of comparisons is conducted for a predetermined time $T_1$. When the value of the I signal has been greater than zero for time period $T_1$, the receiver is set to C-QUAM mode in step 45. Otherwise, the I signal continues to be monitored in step 44. After setting to C-QUAM mode in step 45, the I signal continues to be monitored in step 42.

Figure 5:
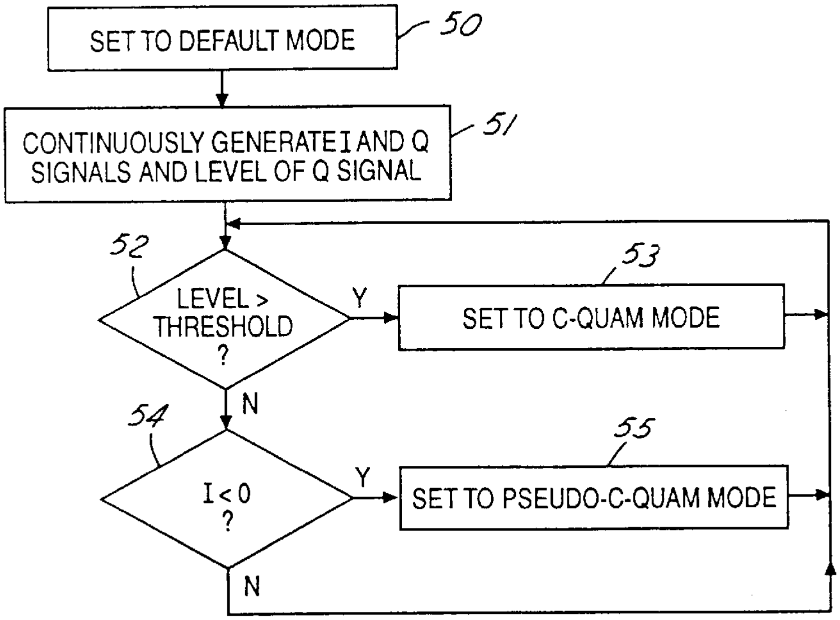
FIG. 5 is a flowchart showing a third embodiment for a method of operating the receiver of FIG. 1.

Another alternative embodiment is shown in FIG. 5 wherein neither mode is preferred. The receiver is initially set to either mode as a default mode in step 50. The I and Q signals and the level of the Q signal are continuously generated in step 51. In step 52, the level of the Q signal is compared to the threshold. When the level is greater than the threshold, the receiver is set to C-QUAM mode in step 53. Otherwise, the instantaneous value of the I signal is compared to zero in step 54. If less than zero, then the receiver is set to pseudo-C-QUAM mode in step 55. The comparisons of step 52 and 54 are then continuously repeated in order to determine whether the current mode of the receiver cannot reproduce the currently received broadcast signal without distortion. It should be noted that the comparisons of step 52 and 54 are mutually exclusive at any one time. Thus, over-modulation could not be coincident with a high level of stereo difference information since a high level of the Q signal implies a low level of the I signal.

What is claimed is:

1. A method for reproducing left and right stereo audio signals in response to an AM stereo broadcast signal wherein a stereo sum signal and a stereo difference signal are modulated using compatible quadrature amplitude modulation (C-QUAM) including a correction factor, said method comprising the steps of:

converting said broadcast signal to an intermediate frequency (IF) signal;

generating coherent sine and cosine injection signals in response to said IF signal;

mixing said sine and cosine injection signals with said IF signal to produce an in-phase demodulated (I) signal and a quadrature-phase demodulated (Q) signal, respectively; and decoding said stereo sum and stereo difference signals in a C-QUAM mode during a first predetermined condition of at least one of said I and Q signals and in a pseudo-C-QUAM mode during a second predetermined condition of at least one of said I and Q signals;

wherein said C-QUAM mode includes modifying at least said Q signal according to a cosine correction factor prior to decoding said stereo sum and stereo difference signals, and wherein said pseudo-C-QUAM mode does not modify said I or Q signals according to said cosine correction factor prior to decoding said stereo sum and stereo difference signals.

2. The method of claim 1 wherein said first predetermined condition is detected by the steps of:

detecting a level of said Q signal;

comparing said level of said Q signal to a first predetermined threshold; and selecting said C-QUAM mode if said level of said Q signal is greater than said first predetermined threshold.

3. The method of claim 2 wherein said second predetermined condition is detected by the further step of:

when said C-QUAM mode is already selected, then selecting said pseudo-C-QUAM mode if said level of said Q signal falls below a second predetermined threshold which is less than said first predetermined threshold.

4. The method of claim 1 wherein said decoding step uses said pseudo-C-QUAM mode if an instantaneous value of said I signal is less than about zero.

5. The method of claim 4 further comprising the step of:

maintaining said selection of said pseudo-C-QUAM mode for at least a predetermined time after said instantaneous value of said I signal is detected as being less than zero.

6. The method of claim 5 further comprising the step of:

returning to said C-QUAM mode after said predetermined time if said instantaneous value of said I signal has not again been detected as being less than about zero during said predetermined time.

7. The method of claim 1 further comprising the steps of:

detecting a level of said Q signal;

comparing said level of said Q signal to a predetermined threshold;

selecting said C-QUAM mode if said level of said Q signal is greater than said threshold;

selecting said pseudo-C-QUAM mode if an instantaneous value of said I signal is less than about zero.

8. A radio receiver for reproducing left and right stereo audio signals in response to an AM stereo broadcast signal wherein a stereo sum signal and a stereo difference signal are modulated using compatible quadrature amplitude modulation (C-QUAM) including a correction factor, said receiver comprising:

a tuner converting said broadcast signal to an intermediate frequency (IF) signal;

a coherent signal generator generating coherent sine and cosine injection signals in response to said IF signal;

a first mixer mixing said IF signal with said cosine injection signal to generate an inphase (I) signal;

a second mixer mixing said IF signal with said sine injection signal to generate a quadrature-phase (Q) signal;

an envelope detector generating an envelope signal in response to said I and Q signals;

a correction factor generator reproducing a correction factor signal in response to said I signal and said envelope signal;

a third mixer mixing said Q signal with said correction factor signal to generate a corrected Q signal;

a signal classifier receiving at least one of said I and Q signals and generating a mode selection signal, wherein said mode selection signal is comprised of a C-QUAM mode signal during predetermined conditions and is comprised of a pseudo-C-QUAM mode signal during second predetermined conditions;

a stereo decoder having first and second inputs and reproducing said left and right stereo audio signals; and a signal multiplexer coupling said Q signal to said first input of said stereo decoder in response to said pseudo-C-QUAM mode signal and coupling said corrected Q signal to said first input of said stereo decoder in response to said C-QUAM mode signal.

9. The radio receiver of claim 8 further comprising:

a fourth mixer mixing said I signal with said correction factor signal to generate a corrected I signal;

wherein said signal multiplexer further couples either said I signal or said corrected I signal to said second input of said stereo decoder in response to said mode signal.

10. The radio receiver of claim 8 wherein said signal classifier detects a level of said Q signal, and wherein said signal classifier generates said C-QUAM mode signal if said level of said Q signal is greater than a first predetermined threshold.

11. The radio receiver of claim 8 wherein said signal classifier generates said pseudo-C-QUAM mode signal if said I signal has an instantaneous value less than about zero.

* * * * *